(12) United States Patent
Ni et al.

(10) Patent No.: US 11,402,625 B2
(45) Date of Patent: Aug. 2, 2022

(54) PHOSPHOR WHEEL HAVING A BALANCING PIECE

(71) Applicant: Materion Precision Optics (Shanghai) Limited, Shanghai (CN)

(72) Inventors: Carter Ni, Shanghai (CN); James Li, Shanghai (CN)

(73) Assignee: MATERION PRECISION OPTICS (SHANGHAI) LIMITED, Shanghai (CN)

( * ) Notice: Subject to any disclaimer, the term of this patent is extended or adjusted under 35 U.S.C. 154(b) by 143 days.

(21) Appl. No.: 16/616,589

(22) PCT Filed: Jun. 29, 2017

(86) PCT No.: PCT/CN2017/090829
§ 371 (c)(1),
(2) Date: Nov. 25, 2019

(87) PCT Pub. No.: WO2019/000329
PCT Pub. Date: Jan. 3, 2019

(65) Prior Publication Data
US 2021/0286166 A1    Sep. 16, 2021

(51) Int. Cl.
*G02B 26/00* (2006.01)
*G03B 21/20* (2006.01)

(52) U.S. Cl.
CPC ......... *G02B 26/008* (2013.01); *G03B 21/204* (2013.01); *G03B 21/2066* (2013.01)

(58) Field of Classification Search
CPC ...... G03B 21/20; G03B 21/204; G03B 33/08; G03B 21/2066; G02B 26/008
See application file for complete search history.

(56) References Cited

U.S. PATENT DOCUMENTS

| 6,963,457 B1 * | 11/2005 | Niwa | G02B 26/008 |
| | | | 348/743 |
| 2003/0035218 A1 * | 2/2003 | Hung | G02B 26/008 |
| | | | 359/618 |

(Continued)

FOREIGN PATENT DOCUMENTS

| CN | 105351887 A | 2/2016 |
| CN | 105892200 A | 8/2016 |

(Continued)

OTHER PUBLICATIONS

Search Report dated Apr. 21, 2021; appl. No. 106132161; 11 pages.

(Continued)

*Primary Examiner* — Magda Cruz
(74) *Attorney, Agent, or Firm* — Tucker Ellis LLP

(57) ABSTRACT

A phosphor wheel (300, 400, 500, 600) includes an annular disc (310, 410, 510, 610) having phosphor segments (320, 420, 522, 524, 620) and an exposed annular sector (305, 405, 505, 605), a hub (330, 430, 530, 630) coupled to the inner perimeter (304, 413) of the annular disc, and a balancing piece (340, 440, 540, 640) located between the hub and the exposed annular sector. The balancing piece minimizes the initial imbalance of the phosphor wheel about the center (301, 441, 541) of the disc due to the exposed annular sector by making up the difference in torque. A method for making a phosphor wheel, a projector comprising a phosphor wheel, and a method for minimizing imbalance in a phosphor wheel.

20 Claims, 12 Drawing Sheets

(56) References Cited

U.S. PATENT DOCUMENTS

| | | | |
|---|---|---|---|
| 2005/0122485 A1* | 6/2005 | Kao | G02B 26/008 |
| | | | 353/84 |
| 2010/0245776 A1* | 9/2010 | Yamamoto | G03B 21/204 |
| | | | 353/38 |
| 2016/0069535 A1 | 3/2016 | Liu et al. | |
| 2016/0291315 A1* | 10/2016 | Hsu | G02B 26/008 |
| 2016/0363294 A1* | 12/2016 | Yu | B60Q 1/02 |
| 2017/0003498 A1* | 1/2017 | Liu | G02B 26/008 |
| 2017/0127026 A1* | 5/2017 | Hsu | G03B 21/204 |
| 2017/0269461 A1* | 9/2017 | Ikeda | G02B 26/008 |
| 2017/0269464 A1* | 9/2017 | Tsai | G03B 21/204 |
| 2018/0373023 A1* | 12/2018 | Fujii | G02B 5/0278 |
| 2019/0137858 A1* | 5/2019 | Hsieh | G03B 21/2066 |

FOREIGN PATENT DOCUMENTS

| | | | | |
|---|---|---|---|---|
| CN | 106597787 A | * | 4/2017 | G03B 21/20 |
| CN | 106597787 A | | 4/2017 | |
| CN | 106681092 | | 5/2017 | |
| CN | 106681092 A | | 5/2017 | |
| JP | 2003057424 | | 2/2003 | |
| JP | 2006301600 | | 11/2006 | |
| JP | 2007316632 | | 12/2007 | |
| JP | 2011070882 A | | 4/2011 | |
| TW | 201525604 A | | 7/2015 | |
| TW | 201715288 A | | 5/2017 | |

OTHER PUBLICATIONS

International Search Report dated Apr. 4, 2018 from PCT/CN2017/090829.

\* cited by examiner

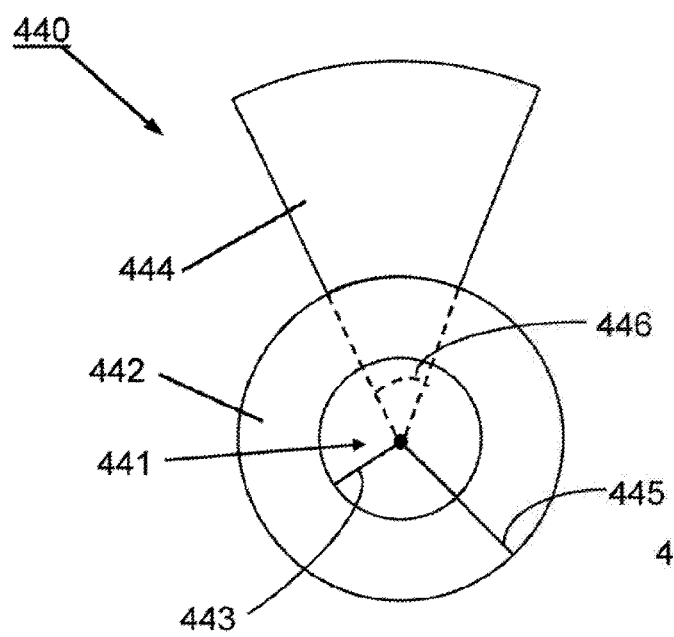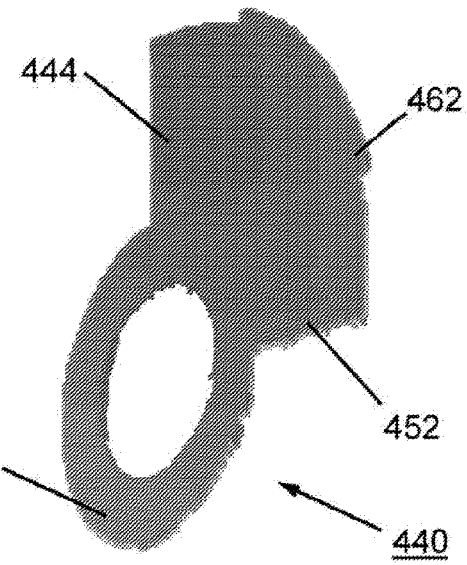
FIG. 2C  FIG. 2D

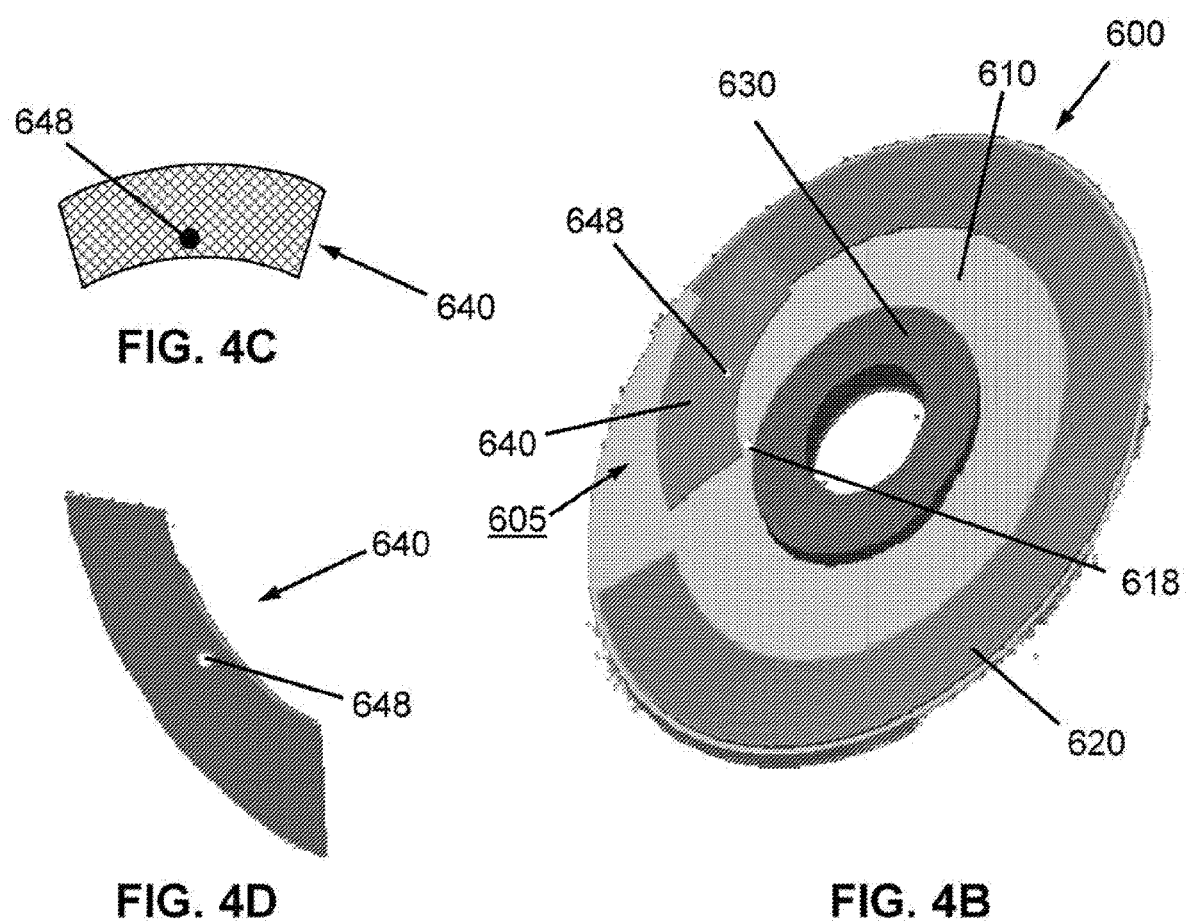

PHOSPHOR WHEEL HAVING A BALANCING PIECE

BACKGROUND

The following relates to phosphor wheels and methods for manufacturing such phosphor wheels. These are used in optical devices for producing different colors of light, or light of different wavelengths.

Phosphor wheels are used in a variety of optical devices such as projection-based or other picture generation systems using Digital Light Processing (DLP) technology. The phosphor wheel comprises a hub portion, which is a cylindrical body that acts as a rotor when coupled to a motor. An optically-active radial portion, usually a metal plate, is attached to or integrated with the hub portion. Wavelength conversion materials (phosphors) on the optically-active radial portion generate emission light of a different wavelength from incident excitation light.

Because blue phosphor powder has low conversion efficiency, a blue laser lighting source is used in many laser projectors. The phosphor wheel can also have one or more gaps to pass the blue source light through unconverted. Such structures increase the undesirable air noise generated by rotating the phosphor wheel.

To solve the noise issue, structures have been designed with a glass segment included in the slot. These structures, however, face different problems due to the differences in material density between the glass and the metal from which the metal plate is constructed. For example, an aluminum plate has a material density of 2.70 $g/cm^3$, while a glass segment has a material density of 2.38 $g/cm^3$, such that an initial imbalance of 320 milligrams at a radius of 8.25 mm (abbreviated as 320 mg@8.25 mm) exists. Further, the phosphors (e.g., red, yellow, and green) bonded to or dispensed on the disc also have different densities. This leads to an initial unbalance that is greater than current balancing process capabilities, which are typically less than 150 mg@8.25 mm, especially for an aluminum wheel of 30 mm outer diameter. In use, phosphor wheels are typically rotated at high speeds, typically between 7200 rpm and 14400 rpm. At these high speeds, imbalanced phosphor wheels are incapable of remaining rotationally symmetric in terms of mass distribution, which can result in vibration issues and reduce the product's lifetime.

Additionally, the glass segments used in conventional phosphor wheels need to have sufficiently large shear strengths to overcome the centrifugal forces experienced as the wheel rotates. In conventional constructions, achieving a large enough bonding strength is achieved by simply increasing the bond area. This, however, leads to the metal plates (referred to as hubs) having very large diameters. This leads to increased weight and overloading of the motor used to rotate the wheel. This can lead to undesirable quality problems such as increased tilt, vibration issues, more noise, reduced product lifetime, and reduced motor performance.

It would therefore be desirable to design a phosphor wheel that solves the large initial imbalance problem under motor loading while also enhancing the glass segment bonding strength.

BRIEF DESCRIPTION

The present disclosure relates to phosphor wheels which reduce the large initial imbalance problems experienced by conventional phosphor wheels. In phosphor wheels containing a glass segment, the phosphor wheels disclosed herein can also enhance the glass segment bonding strength without increasing the diameter of the overall wheel. Briefly, a balancing piece, made of a material with a higher density than the disc portion of the wheel, is affixed between the center of the disc and the slot/segment/sector/glass segment. This balancing piece increases the overall density of that side of the wheel, reducing torque imbalances.

Disclosed in various embodiments are phosphor wheels, comprising: an annular disc; a light-emitting annular sector placed along an outer perimeter of the disc to define an exposed annular sector of the annular disc; a hub coupled along an inner perimeter of the disc; and a balancing piece attached to a front surface of the disc radially inward from the aperture exposed annular sector for minimizing imbalance of the phosphor wheel. The annular disc is adapted to process light incident thereon. The outer perimeter of the disc can be considered to be the outer boundary of an annular light-emitting area that includes at least one luminescent material (e.g., a light-emitting phosphor) disposed thereon. The hub is configured to act as a rotor, and is used for coupling to an associated motor.

In particular embodiments, the annular disc is made from a disc material having a first density. The balancing piece is made from a metal material having a second density. The second density is greater than the first density, or in other words the disc material is less dense than the metal material. In particular embodiments, the balancing piece is made of stainless steel or other material with high density.

The balancing piece may be located between the exposed annular sector and the hub, and is in the shape of an annular sector. Such a construction may occur, for example, when the annular disc includes an aperture or slot that is intended to pass blue light, but no glass segment is inserted into the aperture/slot or when the exposed annular sector is used to reflect blue light.

In other embodiments, the balancing piece is also located between the aperture exposed annular sector of the disc and the hub. However, the balancing piece has the shape of a first annular sector having a first central angle that is joined to a second annular sector further away from the hub having a second central angle, and the first central angle is greater than the second central angle. This structure may be used to place more weight closer to the hub of the phosphor wheel.

In many embodiments contemplated by the present disclosure, the annular disc includes an aperture in the exposed annular sector, and the phosphor wheel further comprises a transparent piece inserted into the aperture of the disc.

In other constructions, the balancing piece comprises a first portion and a second portion. The first portion is in the shape of an annulus placed between the annular disc and the hub. The second portion is in the shape of an annular sector extending outwardly from the first portion toward the exposed annular sector aperture of the annular disc.

Sometimes, the balancing piece comprises a first portion and a second portion. The first portion is in the shape of an annulus placed between the annular disc and the hub. In these embodiments, the second portion has the shape of a first annular sector having a first central angle that is joined to a second annular sector further away from the hub having a second central angle, wherein the first central angle is greater than the second central angle. Again, this places more weight near the center of the wheel, i.e. the hub.

In some embodiments, the balancing piece includes the first portion and the second portion as described above, and further includes a third portion. The third portion is an annular sector extending outwardly from the first portion toward the outer perimeter of the disc, and the third portion is spaced apart from the second portion. This is intended for structures using two different phosphor segments of different densities, so that any rotational torque imbalances due to the phosphor segments can also be minimized.

In other embodiments, the balancing piece includes pins and the annular disc includes indents into which the pins are inserted. This improves the ease of assembly.

The balancing piece may have a thickness of from about 0.2 mm to about 0.4 mm. The disc may have a high-reflectivity coating, so it can be operated as a reflective phosphor wheel. The disc can be made of aluminum or an aluminum alloy.

The light-emitting annular sector of the phosphor wheel may be in the form of a first phosphor segment on a first sector of the annular disc and a second phosphor segment on a second sector of the annular disc. In particular embodiments, the first phosphor segment includes a green light-emitting phosphor; and the second phosphor segment includes a red or yellow light-emitting phosphor. The first phosphor segment may have a lower density than the second phosphor segment.

Also disclosed are methods for making a phosphor wheel, comprising: receiving an annular disc having an aperture exposed annular sector defined by a light-emitting annular sector on the annular disc; coupling a hub along an inner perimeter of the disc; and attaching a balancing piece to a front surface of the disc radially inward from the aperture exposed annular sector to minimize imbalance of the phosphor wheel.

When an aperture is present in the exposed annular sector (i.e. through the annular disc), a transparent piece can be placed into the aperture, wherein the balancing piece is also bonded to the transparent piece. The balancing piece can be made by a punch process or a wire cut process.

Also disclosed are projectors comprising a phosphor wheel, wherein the phosphor wheel comprises: an annular disc having an aperture exposed annular sector defined by a light-emitting annular sector; a hub coupled along an inner perimeter of the disc; and a balancing piece attached to a front surface of the disc radially inward from the exposed annular sector for minimizing imbalance of the phosphor wheel.

Also disclosed are methods for minimizing imbalance in a phosphor wheel comprising an annular disc with an exposed annular sector, comprising placing a balancing piece upon the disc radially inward from the exposed annular sector. The annular disc is made from a disc material having a first density, and the balancing piece is made from a metal material having a second density; and the second density is greater than the first density.

Desirably, the phosphor wheels have as low of an initial imbalance as possible. For example, in particular embodiments, the phosphor wheel has an initial imbalance of less than 100 mg @ 8.25 mm, including less than 50 mg @ 8.25 mm, and as low as 20 mg @ 8.25 mm or less.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 2C is a plan view of the balancing piece of the second exemplary phosphor wheel of FIG. 2A.

FIG. 2D is a perspective view of another balancing piece that can be used with the phosphor wheel of FIG. 2A.

FIG. 4B is a plan view of the balancing piece of the fourth exemplary phosphor wheel of FIG. 4A. FIG. 4C is a perspective view of the balancing piece of FIG. 4B. FIG. 4D is an exploded perspective view of the fourth exemplary phosphor wheel of FIG. 4A.

DETAILED DESCRIPTION

Figure 1A:
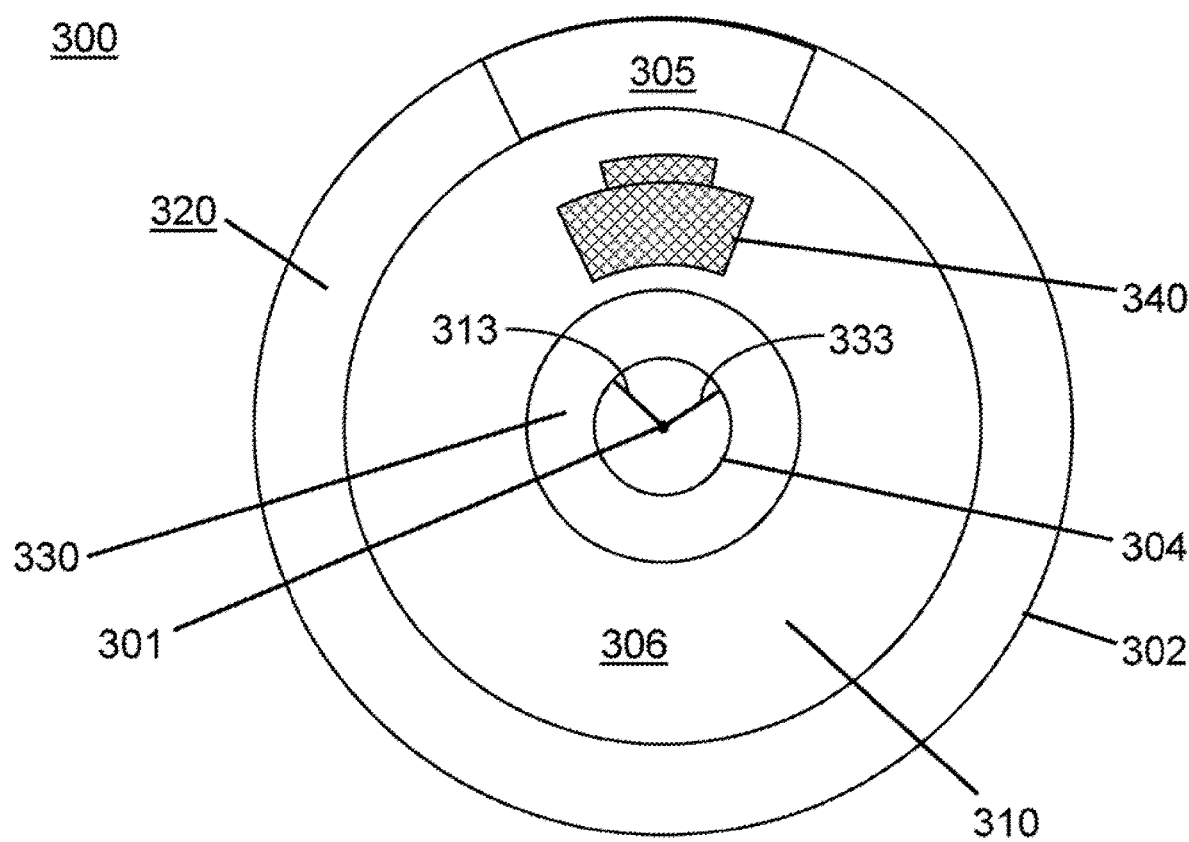
FIG. 1A is a plan view of a first exemplary embodiment of a phosphor wheel according to the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

For reference, the color red usually refers to light having a wavelength of about 780 nanometers to about 622 nanometers. The color green usually refers to light having a wavelength of about 577 nanometers to about 492 nanometers. The color blue usually refers to light having a wavelength of about 492 nanometers to about 455 nanometers. The color yellow usually refers to light having a wavelength of about 597 nanometers to about 577 nanometers. However, this may depend on the context. For example, these colors are sometimes used to label various parts and distinguish those parts from each other.

The term "annular sector" is used herein to refer to the portion of an annulus that is enclosed by two concentric arcs and two radii from the common center. The term "annular segment" has the same definition as "annular sector". In this context, the term "segment" expressly does not refer to the area of a circle bounded by a chord and the arc subtended by the chord.

The present disclosure relates to a phosphor wheel which solves the large initial imbalance problems experienced by conventional phosphor wheels and also enhances the glass segment bonding strength without increasing the diameter of the phosphor wheel.

Figure 1B:
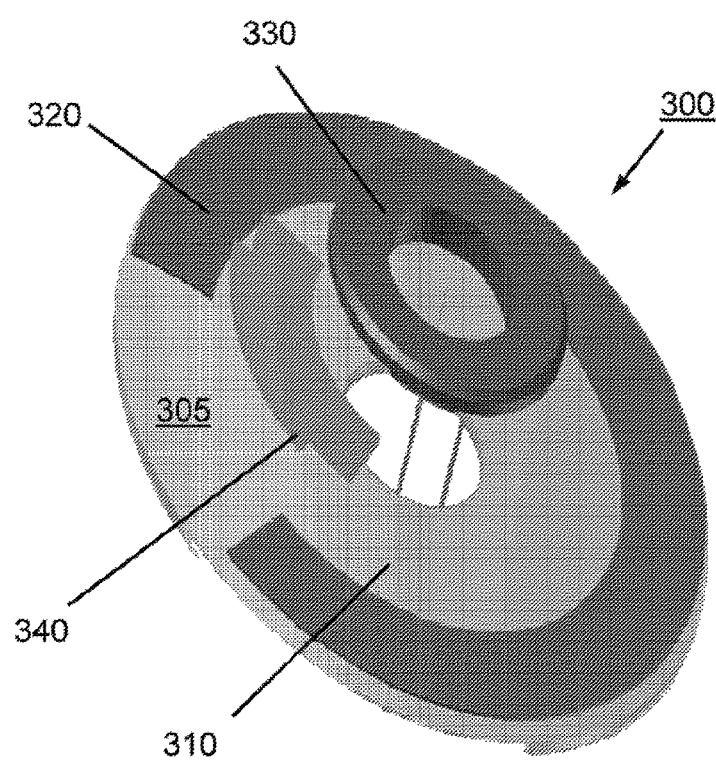
FIG. 1B is an exploded perspective view of the first exemplary phosphor wheel of FIG. 1A.
Figure 1C:
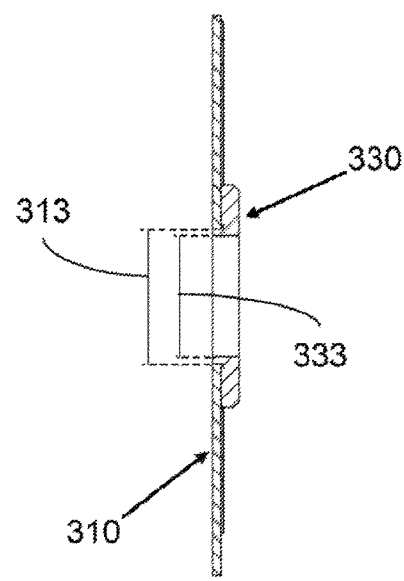
FIG. 1C is a side cross-sectional view of the first exemplary phosphor wheel of FIG. 1A.

A first exemplary embodiment of a phosphor wheel according to the present disclosure is illustrated in FIG. 1A and FIG. 1B. FIG. 1A is a plan view, FIG. 1B is an exploded perspective view, and FIG. 1C is a side cross-sectional view. This phosphor wheel is a reflective phosphor wheel, where the excitation light of the blue light laser does not pass through the annular disc.

The first exemplary phosphor wheel 300 includes an annular disc 310 that is configured to optically process incident light. The annular disc 310 has a center 301, an outer perimeter 302, and an inner perimeter 304. The outer perimeter of the disc 310 includes a light-emitting area 320 in the shape of an annular sector. The two ends of the light-emitting area surround and define an exposed annular sector 305 along the outer perimeter of the annular disc. As seen in FIG. 1B, the annular disc is visible in the exposed annular sector 305.

The light-emitting area 320 is made up of one or more annular segments (here, the light-emitting area is shown as a single segment). Generally, the light-emitting area includes one or more luminescent materials (e.g. phosphors), such that rotation of the phosphor wheel generates light of different colors sequentially. The luminescent materials can be, for example, phosphor powders or phosphor ceramics deposited upon the disc 310. The luminescent materials can include a binder for aiding in attachment to the disc or can be bonded to the disc using conventional techniques.

The hub 330 has an annular shape, and is coaxially aligned with the inner perimeter 304 of the annular disc. Put another way, the hub 330 is coupled to the annular disc along the inner perimeter of the disc. The hub 330 is also located on the front surface 306 of the disc 310. The hub 330 is generally made of metal and is configured to act as a rotor for coupling to an associated motor. The hub has an inner diameter 333 from the center 301, and the disc 310 has an inner diameter 313. Referring to FIG. 1C, it can be seen that the inner diameters 313, 333 are substantially equal, with the inner diameter 313 of the disc being greater than the inner diameter 333 of the hub.

A balancing piece 340 is attached to the disc 310. The balancing piece 340 is bonded to the disc 310 (e.g., using a glue or solder). As seen best in FIG. 1A, the balancing piece 340 is disposed radially inward from the aperture 305 of the disc 310. Put another way, the balancing piece 340 is located between the hub 330 and the exposed annular sector 305. The balancing piece 340 increases the weight of the phosphor wheel 300 so that the wheel is better balanced considering the lack of phosphor in the exposed annular sector 305. The balancing piece 340 is generally axially aligned in the same plane as the luminescent materials in the light-emitting area 320 of the disc 310. Put another way, the balancing piece 340 is attached to the front surface 306 of the annular disc as well.

Figure 1D:
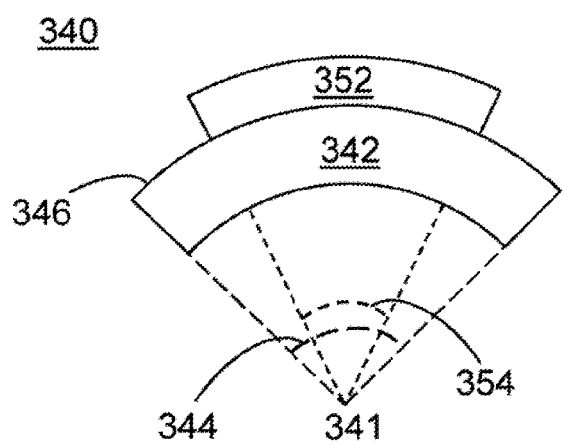
FIG. 1D is a plan view of the balancing piece of the first exemplary phosphor wheel of FIG. 1A.
Figure 1E:
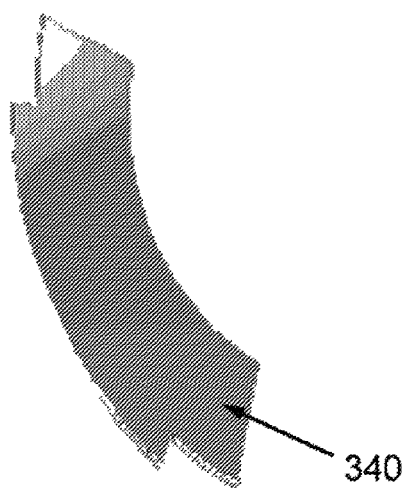
FIG. 1E is a perspective view of the balancing piece of FIG. 1D.

The shape of the balancing piece 340 used in this first exemplary embodiment is further depicted in FIG. 1D and FIG. 1E. The balancing piece 340 has two adjoining components 342, 352. The first component 342 has the shape of an annular sector, and has a first central angle 344 relative to imaginary center 341. The first component also has an outer arc 346. The second component 352 also has the shape of an annular sector, and has a second central angle 354 relative to imaginary center 341. The second component 352 is located further away from the hub 330 on the annular disc, or put another way, the second component 352 is joined to the outer arc 346 of the first component 342. The first central angle 344 is greater than the second central angle 354. Both central angles are usually less than 180°, and usually less than 60°.

It is noted that the center 341 used to determine the shape of the components 342, 352 of the balancing piece 340 usually coincides with the center 301 of the annular disc 310. It is also contemplated that the balancing piece can take the form of a single annular sector, rather than being made up of two annular sectors with different central angles as shown here.

As discussed above, the balancing piece 340 is used to make up for the weight that is absent from the disc 310 due to the aperture 305. To do so, the annular disc 310 is made from a disc material having a first density, and the balancing piece 340 is made from a metal material having a second density. The second density is greater than the first density. In other words, the balancing piece is made from a denser material than the annular disc. For example, the annular disc may be made of aluminum, which has a density of 2.7 g/cm$^3$. The balancing piece, on the other h and, may be made from stainless steel, which has a density of about 7.5 g/cm$^3$ to about 8.5 g/cm$^3$ (depending on the grade used).

Figure 2A:
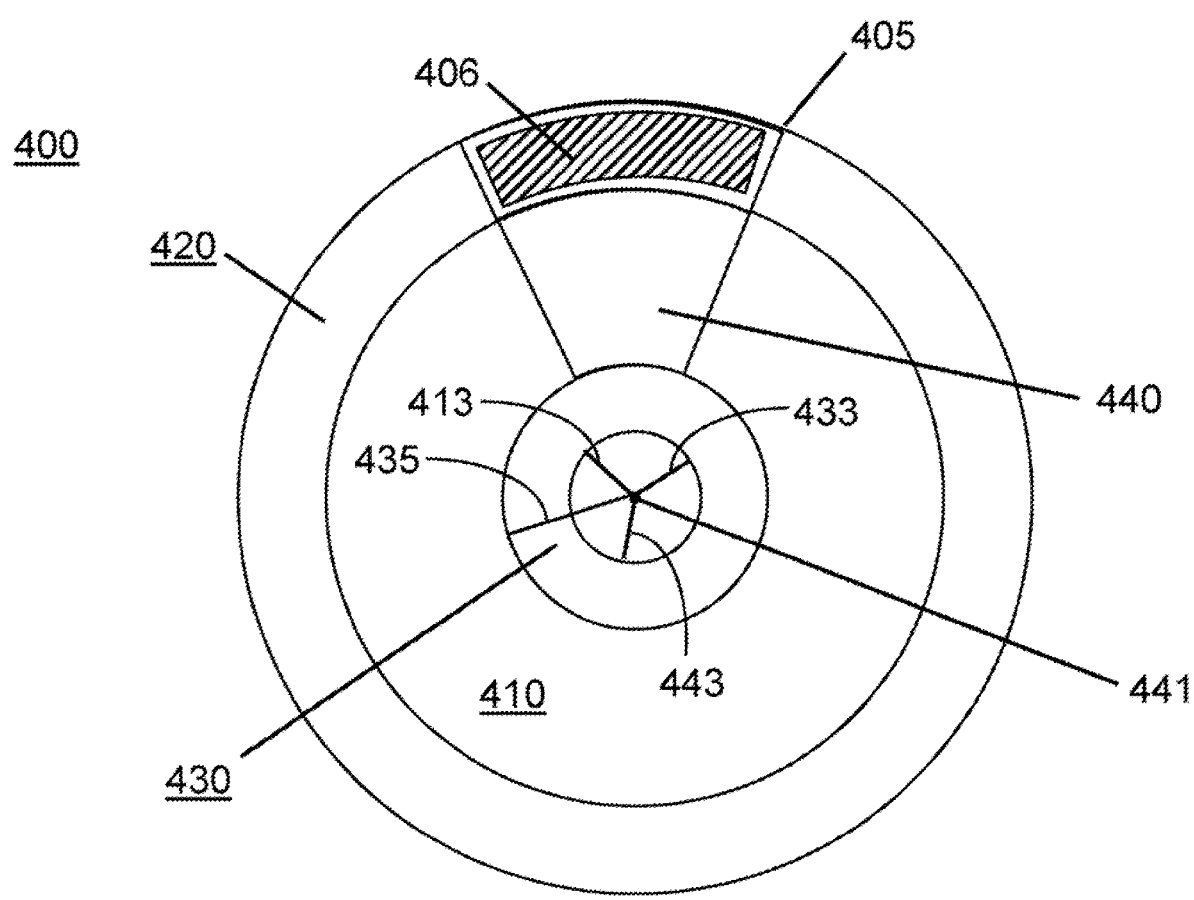
FIG. 2A is a plan view of a second exemplary embodiment of a phosphor wheel according to the present disclosure.
Figure 2B:
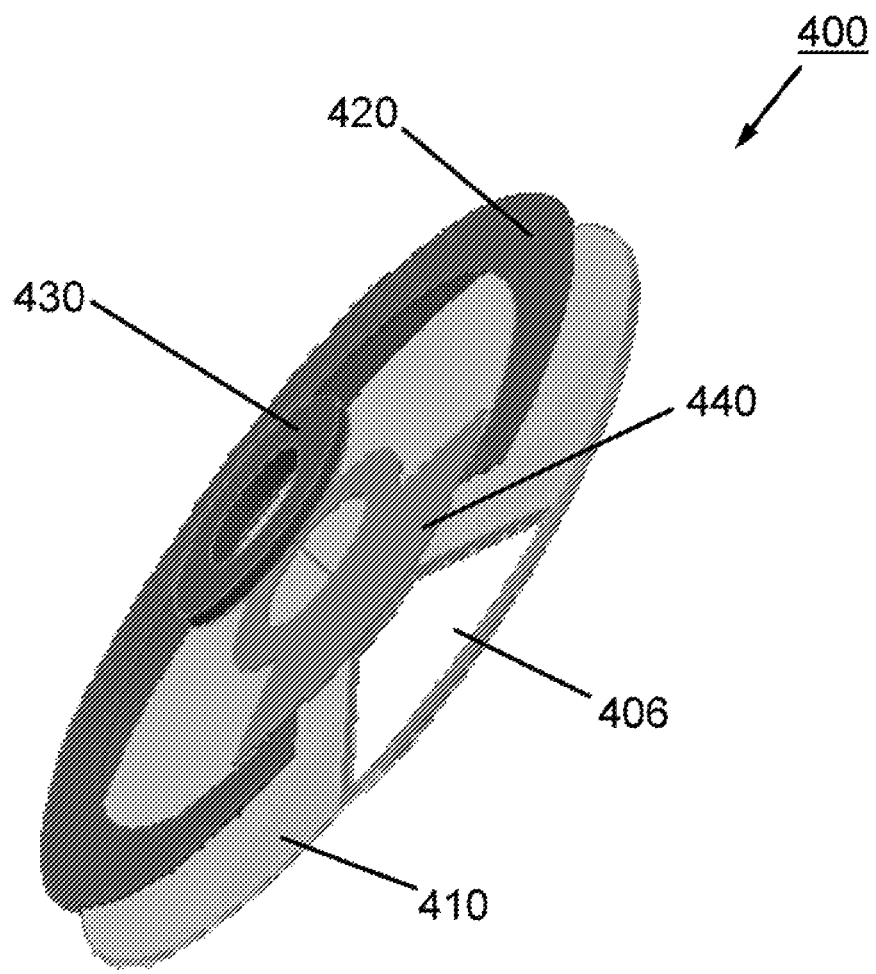
FIG. 2B is an exploded perspective view of the second exemplary phosphor wheel of FIG. 2A.

Turning to FIG. 2A and FIG. 2B, a second exemplary phosphor wheel 400 is illustrated. This second exemplary phosphor wheel 400 is similar in many respects to the first exemplary phosphor wheel 300 illustrated in FIG. 1A and FIG. 1B, and like numbers are used to indicate like components. In this wheel, excitation light passes through the exposed annular sector.

Figure 4A:
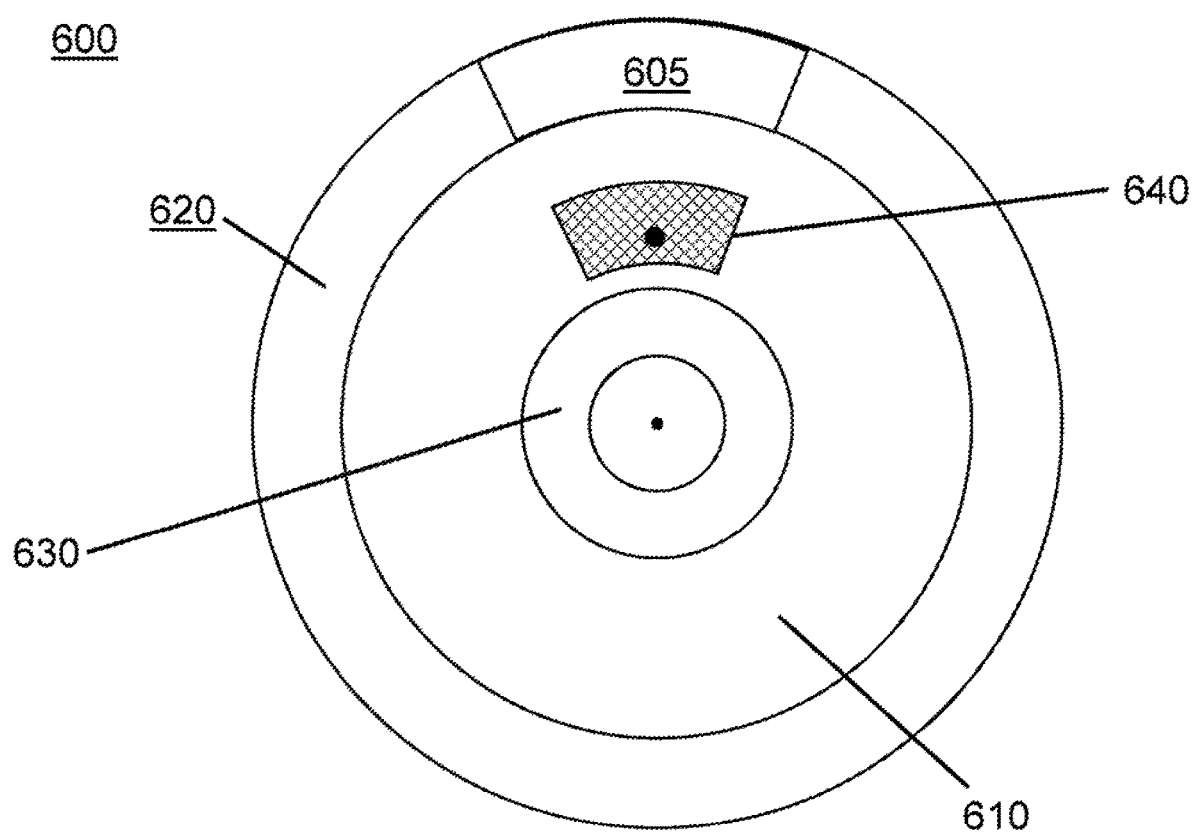
FIG. 4A is a plan view of a fourth exemplary embodiment of a phosphor wheel according to the present disclosure.

Here, the phosphor wheel 400 includes a transparent piece 406 in an aperture/slot in the exposed annular sector 405 of disc 410. The transparent piece 406 permits the blue light to pass through the slot. The aperture may be in the shape of an annular sector. For example, the transparent piece could be made of glass or a heat-resistant ceramic or plastic. Some such ceramics include alumina ($Al_2O_3$), yttria alumina garnet (YAG), and neodymium-doped Nd:YAG. Phosphor segment 420 and hub 430 are also indicated in FIG. 4A.

The balancing piece 440 has a noticeably different shape than the balancing piece 340 of FIG. 1A. Referring now to FIG. 2A and FIG. 2C, the balancing piece 440 of this exemplary embodiment comprises a first portion 442 and a second portion 444. The first portion 442 is configured as an annulus or annular ring that is seated on the disc 410 beneath the hub. The annulus has a center 441. The annulus has an inner diameter 443 from the center 441, and the disc 410 has an inner diameter 413. In particular embodiments, the inner diameters 413, 443, are substantially equal, or in other words the first portion 442 sits entirely upon the disc 410. Similarly, the hub 430 has an inner diameter 433 from the center 441, and in embodiments the inner diameters 443, 433, are substantially equal (with the inner diameter 413 of the disc being greater than the inner diameter 433 of the hub). The first portion 442 also has an outer diameter 445. The hub 430 has an outer diameter 435 from the center 441, and in embodiments the outer diameters 445, 435 are substantially equal.

The second portion 444 extends outwardly from the first portion 442 along the disc 410 toward the outer perimeter thereof. The second portion 444 is in the shape of an annular sector. The second portion 444 extends towards the aperture 405. Again, the central angle 446 of the second portion is generally less than 180°, and usually less than 60°.

FIG. 2D is a perspective view of another embodiment of the balancing piece 440. This embodiment also includes a first portion 442 that is configured as an annular ring that is seated on the disc 410 beneath the hub 430. The second portion 444 extends outwardly from the first portion 442 along the disc 410 toward the outer perimeter thereof, and in the direction of the aperture 405.

The second portion 444 has the same construction as that of FIG. 1D, and that description applies here too. The second portion has two adjoining components 452, 462. The first component has the shape of an annular sector, and has a first central angle relative to center. The first component also has an outer arc. The second component also has the shape of an annular sector, and has a second central angle relative to center. The second component is located further away from the hub on the annular disc, or put another way, the second component is joined to the outer arc of the first component. The first central angle is greater than the second central angle. Both central angles are usually less than 180°, and usually less than 60°. It is noted that the first portion and the second portion are usually made as one integral piece, and are fixed in position relative to each other.

Figure 3A:
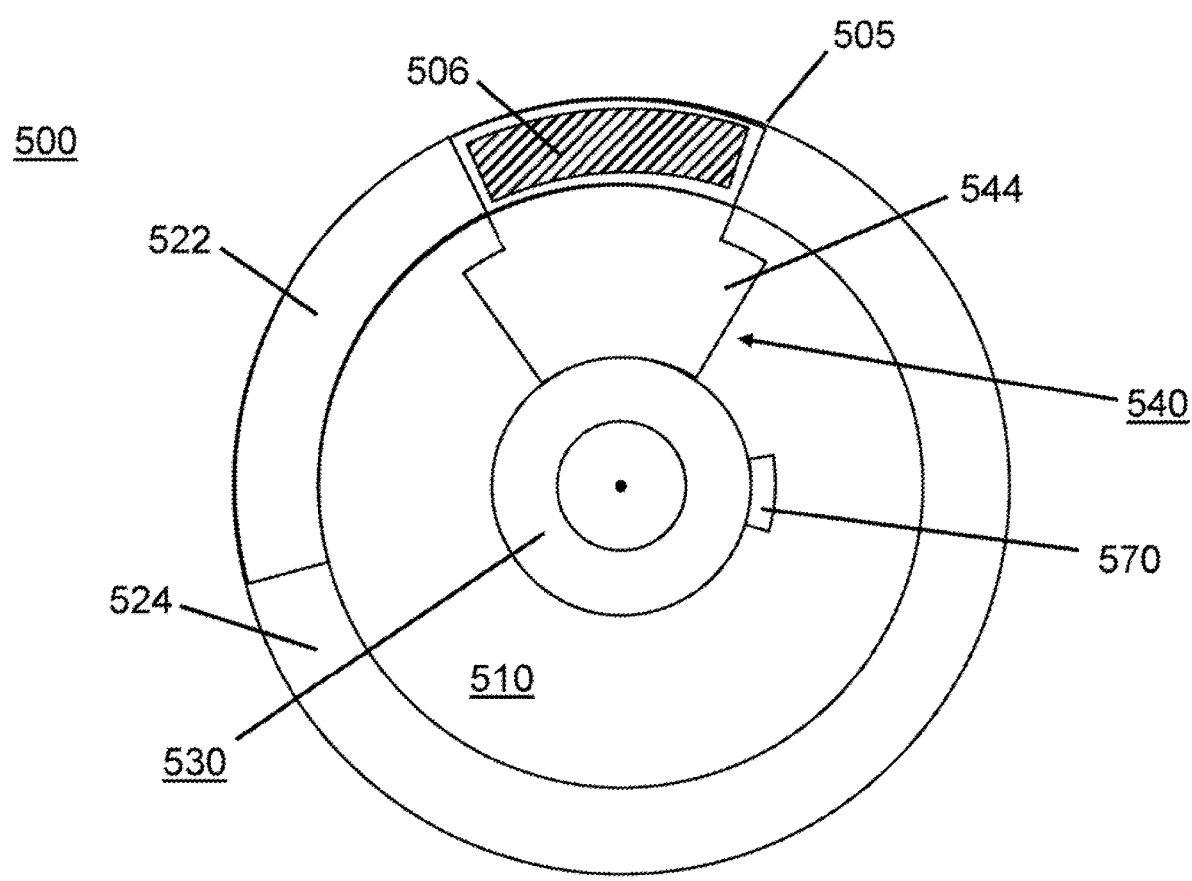
FIG. 3A is a plan view of a third exemplary embodiment of a phosphor wheel according to the present disclosure.
Figure 3B:
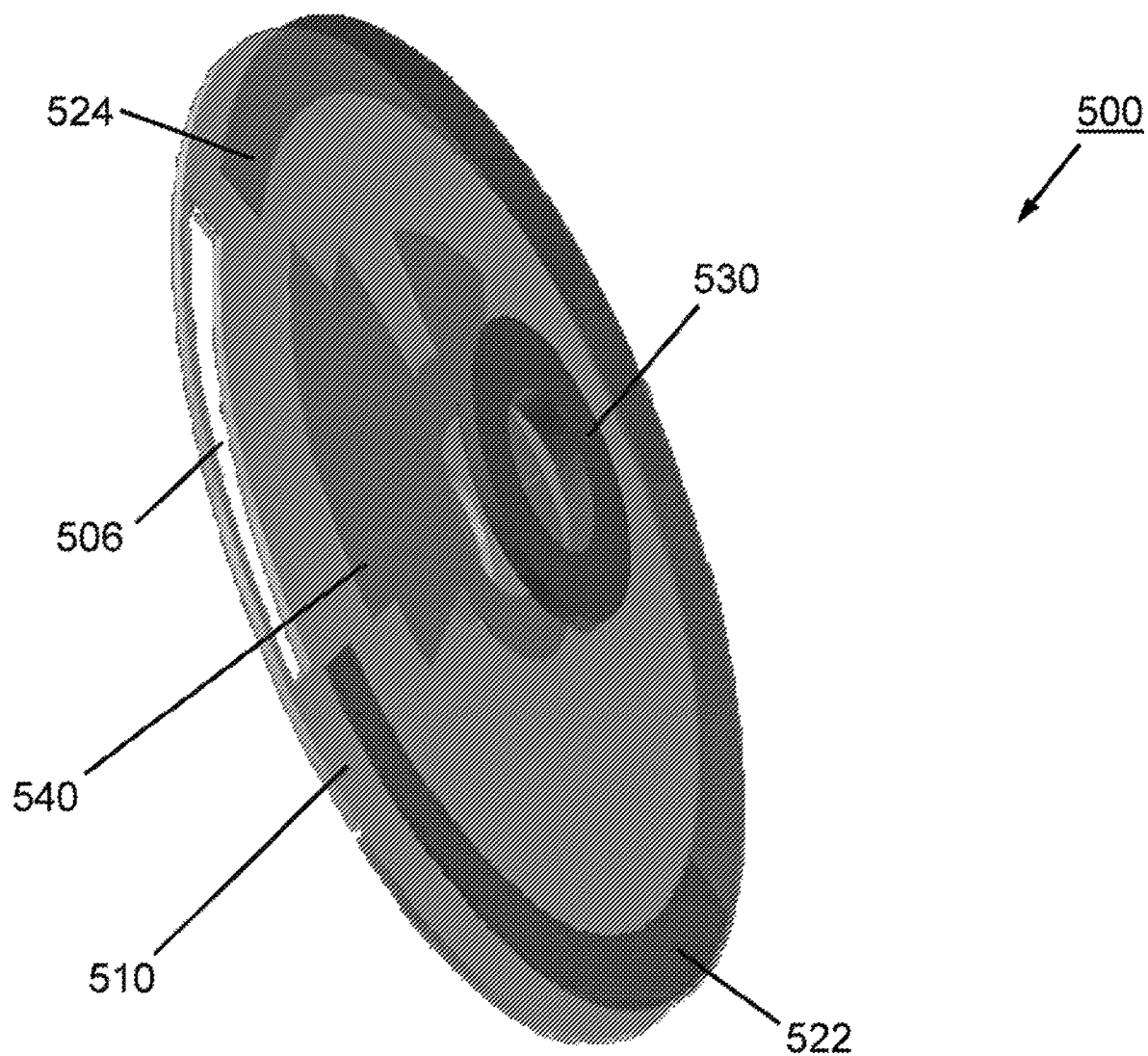
FIG. 3B is a plan view of the balancing piece of the third exemplary phosphor wheel of FIG. 3A.

FIG. 3A and FIG. 3B illustrate a third exemplary phosphor wheel 500. Phosphor wheel 500 likewise includes a slot or glass segment 506 in the exposed annular sector 505 of the disc 510. Additionally, the light-emitting area of the disc 510 is illustrated here as two separate phosphor segments 522, 524, each of which occupy a different annular sector of the disc 510. For example, in this exemplary embodiment, the first segment 522 includes a green light-emitting phosphor and the second segment 524 includes a red or yellow light-emitting phosphor. The hub 530 is also indicated.

Figure 3C:
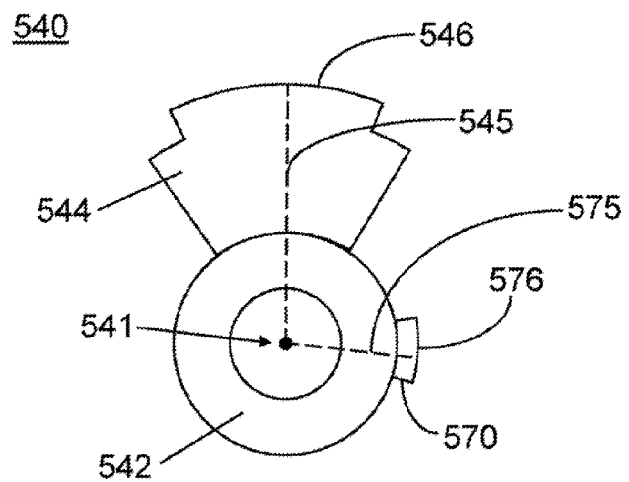
FIG. 3C is a perspective view of the balancing piece of FIG. 3B.
Figure 3D:
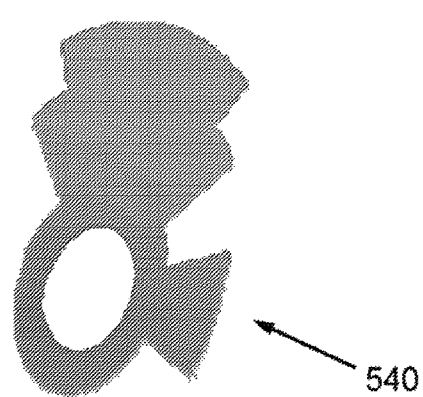
FIG. 3D is an exploded perspective view of the third exemplary phosphor wheel of FIG. 3A.

Phosphor wheel 500 also includes a balancing piece 540. As best seen in FIG. 3C and FIG. 3D, balancing piece 540 includes a first portion 542, a second portion 544, and a third portion 570.

The first portion 542 of the balancing piece is configured as an annular ring, and operates as described above with respect to FIGS. 2A-2D. The relationships between the diameters of the annular disc 510, the hub 530, and the first portion 542 are as described above as well.

The second portion 544 has a shape like that of second portion 444 as described above with respect to FIGS. 2A-2D, having a first component and a second component. The second portion 544 extends outwardly from the first portion 542 along the disc 510 toward the outer perimeter thereof, and in the direction of the exposed annular sector 505.

The third portion 570 is also an annular sector and also extends outwardly from the first portion 542 along the disc 510 toward the outer perimeter thereof. The third portion 570 is spaced apart from the second portion 544 along the first portion. As can be seen here, the third portion 570 is smaller than the first portion 542 and is not directly connected thereto. Put another way, the second portion 544 has an outer arc 546 with a radius 545 from center 541. The third portion 570 has an outer arc 576 with a radius 575 from center 541. The radius 545 of the second portion is greater than the radius 575 of the third portion. The third portion 570 can be used to correct other imbalances that may be present in the wheel that are not related to the aperture 505. For example, the third portion 570 extends in a direction opposite the first phosphor segment 522. This could be useful when, for example, the density of the first phosphor segment 522 is much greater than the second phosphor segment 524, such that additional weight needs to be added opposite the first phosphor segment to correct imbalances.

With reference now to FIG. 4A and FIG. 4B, a fourth exemplary phosphor wheel 600 is illustrated. Phosphor wheel 600 is most similar to first exemplary phosphor wheel 300 of FIGS. 1A-1D. The phosphor wheel includes annular disc 610 having light-emitting area 620 thereon, exposed annular sector 605, hub 630, and balancing piece 640.

As can be seen in FIG. 4C and FIG. 4D, the balancing piece 640 is in the form of an annular sector and includes one or more pins 648 therein. As can be seen in FIG. 4D, the pin 648 in the balancing piece 640 is axially aligned with an opening 618 in the disc 610. The pin 648 is inserted into the opening 618 to attach the balancing piece 640 to the disc 610. Such an attachment increases the reliability of the wheel by minimizing the risk of the balancing piece 640 becoming detached from the disc 610. It is to be understood that the pin can have any shape, and is desirably a wedge.

The balancing piece used to correct imbalances in the phosphor wheels of the present disclosure is generally composed of a high density metal or other material with high density greater than 6 $g/cm^3$, such as stainless steel (e.g., stainless steel having a density of about 7.5 $g/cm^3$ to about 8.5 $g/cm^3$), copper (including alloys thereof), or iron (including alloys thereof), etc. The balancing piece is typically very thin (e.g., from about 0.2 mm to about 0.4 mm). Generally, the balancing piece can be produced by a punch process, a wire cut process, or another suitable process once the desired size and shape for minimizing the initial imbalance has been determined.

The disc, on the other hand, is generally composed of a lower density metal, generally less than 4 $g/cm^3$, such as aluminum or an aluminum alloy (e.g. having a density of 2.70 g/cm³). The disc can include a high-reflectivity coating to assist in reflecting incident light.

While many of the balancing pieces used herein are shaped as bi-laterally symmetrical annular sectors, it is to be understood that the balancing pieces can generally be of any shape or size desired to achieve as low as possible of an initial imbalance. Similarly, the balancing pieces can be selectively positioned on the disc as desired, again to achieve as low as possible of an initial imbalance.

Figure 5:
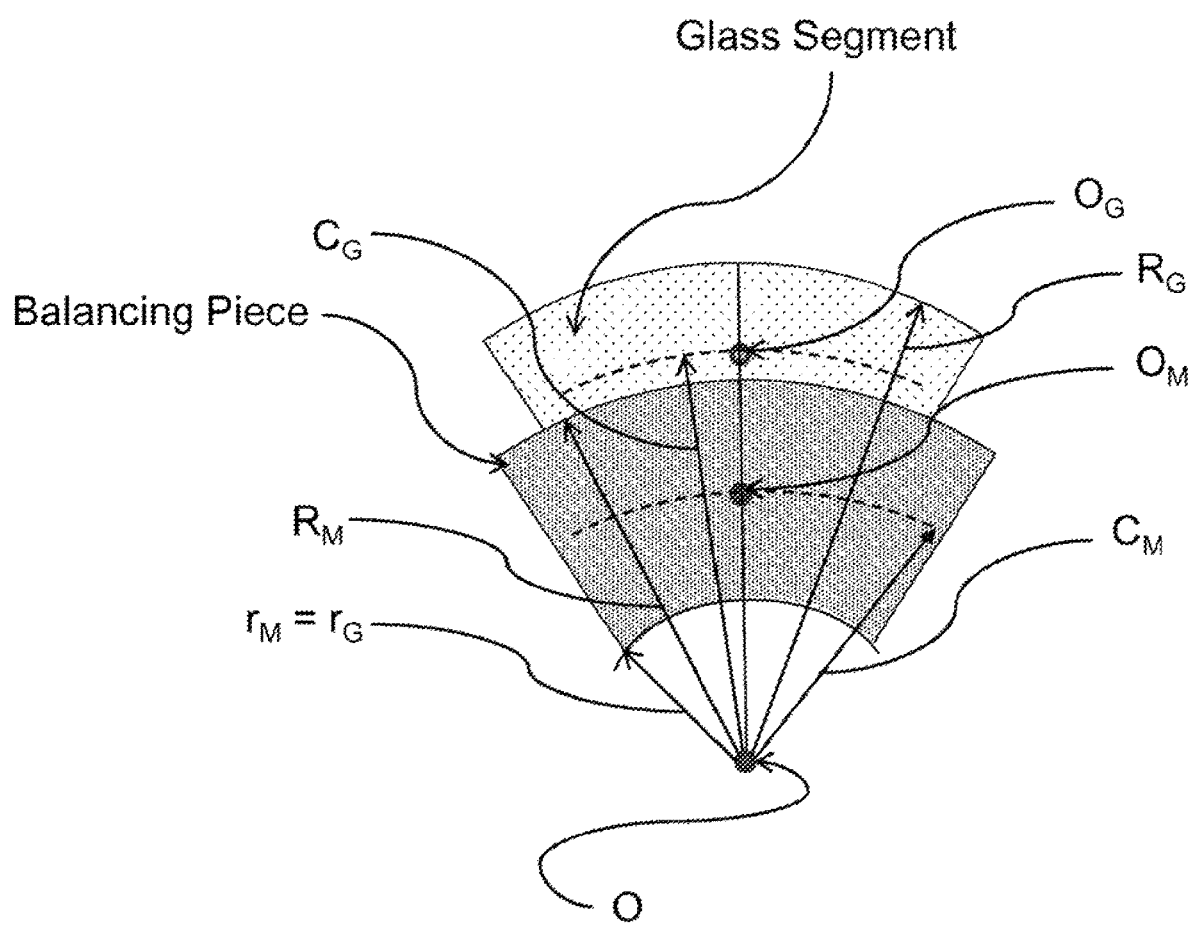
FIG. 5 is a diagram illustrating the variables used to calculate the initial balancing of a phosphor according to the present disclosure.

During the design stage of the phosphor wheel (i.e., before being coupled to an associated motor), the optimal weight and position of the balancing piece on the phosphor wheel can be calculated in order to minimize the initial imbalance of the phosphor wheel. With reference to FIG. 5, the shape and size of the balancing piece can be optimized to achieve the following equation:

$$(W_M)(R_M) \approx (W_G)(R_G)$$

where $W_M$ is the weight of the balancing piece, $W_G$ is the weight of the glass segment, $R_M$ is the radius of the center of gravity of the balancing piece, and $R_G$ is the radius of the center of gravity of the glass segment.

Using the calculation methods and balancing techniques of the present disclosure, a phosphor wheel having a significantly lower weight and initial imbalance than conventional hybrid phosphor wheels was developed. In particular, the table below compares a conventional hybrid phosphor wheel to an improved hybrid phosphor wheel of the present disclosure.

|  | Conventional Hybrid Phosphor Wheel | Improved Hybrid Phosphor Wheel |
| --- | --- | --- |
| Rotor Mass Weight (g) | 14.11 | 10.30 |
| Initial Imbalance (mg @ 8.25 mm) | 307.83 | 11.24 |

As shown, an improved hybrid phosphor wheel having an initial imbalance of just 11.24 mg, which is well below current balancing process capabilities, which are typically less than 150 mg at a radius of 8.25 mm.

When the balancing piece and glass segments are annular sectors, such as is shown in FIG. 5, the center of gravity $C_M$ for the balancing piece and the center of gravity $C_g$ for the glass segment can be determined by the following equation:

$$C_x = \sqrt{2R_x^2 - r_x^2}$$

The present disclosure has been described with reference to preferred embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A phosphor wheel, comprising:
    an annular disc;
    a light-emitting area along an outer perimeter of the annular disc that defines an exposed annular sector of the annular disc;
    a hub coupled along an inner perimeter of the annular disc; and
    a balancing piece attached to a front surface of the annular disc radially inward from the exposed annular sector for minimizing imbalance of the phosphor wheel, wherein the balancing piece has one of:
    a shape of a first annular sector having a first central angle that is joined to a second annular sector further away from the hub having a second central angle, the first central angle is greater than the second central angle; or
    a first portion and a second portion, the first portion is in the shape of an annulus placed between the annular disc and the hub and the second portion extends outwardly from the first portion toward the exposed annular sector of the annular disc.

2. The phosphor wheel of claim 1, wherein the annular disc is made from a disc material having a first density, and the balancing piece is made from a material having a second density; and wherein the second density is greater than the first density.

3. The phosphor wheel of claim 1, wherein the balancing piece is made of stainless steel, copper, a copper-containing alloy, iron, or an iron-containing alloy.

4. The phosphor wheel of claim 1, wherein the balancing piece having the shape of the first annular sector joined to a second annular sector is located between the exposed annular sector and the hub.

5. The phosphor wheel of claim 1, wherein an aperture is present in the exposed annular sector, and wherein a transparent piece is optionally inserted into the aperture of the annular disc.

6. The phosphor wheel of claim 1, wherein the second portion is in the shape of an annular sector.

7. The phosphor wheel of claim 1, wherein the second portion has the shape of a first annular sector having a first central angle that is joined to a second annular sector further away from the hub having a second central angle, wherein the first central angle is greater than the second central angle.

8. The phosphor wheel of claim 7, wherein the balancing piece further includes a third portion, the third portion being an annular sector extending outwardly from the first portion toward the outer perimeter of the annular disc, and wherein the third portion is spaced apart from the second portion.

9. The phosphor wheel of claim 1, wherein the balancing piece includes pins and the annular disc includes openings into which the pins are inserted.

10. The phosphor wheel of claim 1, wherein the balancing piece has a thickness of from about 0.2 mm to about 0.4 mm.

11. The phosphor wheel of claim 1, wherein the annular disc has a high-reflectivity coating.

12. The phosphor wheel of claim 1, wherein the annular disc is made of aluminum or an aluminum alloy.

13. The phosphor wheel of claim 12, wherein the first phosphor segment includes a green light-emitting phosphor; and the second phosphor segment includes a red or yellow light-emitting phosphor.

14. The phosphor wheel of claim 12, wherein the first phosphor segment has a lower density than the second phosphor segment; and
    wherein the balancing piece comprises the first portion and the second portion and a third portion;
    wherein the second portion comprises an annular sector extending outwardly from the first portion toward the exposed annular sector of the annular disc, and the third portion is in the shape of an annular sector extending outwardly from the first portion toward the outer perimeter of the annular disc opposite the first phosphor segment.

15. The phosphor wheel of claim 1, wherein the light-emitting area comprises a first phosphor segment on a first annular sector of the annular disc and a second phosphor segment on a second annular sector of the annular disc.

16. A method for making a phosphor wheel, the method comprising:
   receiving an annular disc having a light-emitting area along an outer perimeter of the annular disc that defines an exposed annular sector;
   coupling a hub along an inner perimeter of the annular disc; and
   attaching a balancing piece to a front surface of the annular disc radially inward from the exposed annular sector to minimize imbalance of the phosphor wheel,
   wherein the balancing piece has one of:
      a shape of a first annular sector having a first central angle that is joined to a second annular sector further away from the hub having a second central angle, the first central angle is greater than the second central angle; or
      a first portion and a second portion, the first portion is in the shape of an annulus placed between the annular disc and the hub and the second portion extends outwardly from the first portion toward the exposed annular sector of the annular disc.

17. The method of claim 16, further comprising placing a transparent piece into an aperture in the exposed annular sector, wherein the balancing piece is also bonded to the transparent piece.

18. The method of claim 16, wherein the balancing piece is made by a punch process or a wire cut process.

19. A projector comprising a phosphor wheel, wherein the phosphor wheel comprises:
   an annular disc having a light-emitting area along an outer perimeter of the annular disc that defines an exposed annular sector;
   a hub coupled along an inner perimeter of the annular disc; and
   a balancing piece attached to a front surface of the annular disc radially inward from the exposed annular sector for minimizing imbalance of the phosphor wheel,
   wherein the balancing piece has one of:
      a shape of a first annular sector having a first central angle that is joined to a second annular sector further away from the hub having a second central angle, the first central angle is greater than the second central angle; or
      a first portion and a second portion, the first portion is in the shape of an annulus placed between the annular disc and the hub and the second portion extends outwardly from the first portion toward the exposed annular sector of the annular disc.

20. A method for minimizing imbalance in a phosphor wheel having an annular disc with a light-emitting area along an outer perimeter of the annular disc that defines an exposed annular sector, comprising:
   placing a balancing piece upon the annular disc radially inward from the exposed annular sector,
   wherein the annular disc is made from a disc material having a first density, and the balancing piece is made from a material having a second density, and
   wherein the second density is greater than the first density, and
   wherein the balancing piece has one of:
      a shape of a first annular sector having a first central angle that is joined to a second annular sector further away from a hub coupled along an inner perimeter of the annular disc, the second annular sector having a second central angle, the first central angle is greater than the second central angle; or
      a first portion and a second portion, the first portion is in the shape of an annulus placed between the annular disc and the hub and the second portion extends outwardly from the first portion toward the exposed annular sector of the annular disc.

* * * * *